US010083458B2

(12) United States Patent
Kikuchi

(10) Patent No.: US 10,083,458 B2
(45) Date of Patent: Sep. 25, 2018

(54) POINT MANAGEMENT SYSTEM AND POINT MANAGEMENT METHOD

(71) Applicant: CREANSMAERD CO., LTD., Tokyo (JP)

(72) Inventor: Kazuo Kikuchi, Tokyo (JP)

(73) Assignee: CREANSMAERD CO., LTD., Tokyo (JP)

( * ) Notice: Subject to any disclaimer, the term of this patent is extended or adjusted under 35 U.S.C. 154(b) by 0 days.

(21) Appl. No.: 15/628,440

(22) Filed: Jun. 20, 2017

(65) Prior Publication Data
US 2017/0286990 A1    Oct. 5, 2017

Related U.S. Application Data

(63) Continuation of application No. PCT/JP2015/070627, filed on Jul. 17, 2015.

(30) Foreign Application Priority Data

Dec. 26, 2014   (JP) ................................. 2014-266513

(51) Int. Cl.
*G06Q 30/00*      (2012.01)
*G06Q 30/02*      (2012.01)
*G06Q 20/06*      (2012.01)

(52) U.S. Cl.
CPC ....... *G06Q 30/0233* (2013.01); *G06Q 20/065* (2013.01); *G06Q 30/0232* (2013.01)

(58) Field of Classification Search
None
See application file for complete search history.

(56) References Cited

U.S. PATENT DOCUMENTS 7,475,038 B2 *   1/2009   Algiene ................. G06Q 20/04
                                                  235/379
7,827,086 B1 *  11/2010   Ellenberg ............... G06Q 30/02
                                                  705/35

(Continued)

FOREIGN PATENT DOCUMENTS

JP      2002-352114 A    12/2002
JP      2008-269283 A    11/2008

(Continued)

OTHER PUBLICATIONS

PCT Application No. PCT/JP2015/070627, Written Opinion of the International Searching Authority, dated Dec. 15, 2015 (English).

(Continued)

*Primary Examiner* — Matthew T Sittner
(74) *Attorney, Agent, or Firm* — Edell, Shapiro & Finnan LLC

(57)    ABSTRACT

There are provided a point management system and a point management method allowing effective use of points acquired by a customer, etc., and prevention of a waste in points. Therefore, exchange for various points or points having acquired a digital ticket is possible, exchange using foreign currency is possible, and the number of points desired to be traded for each type of currency, and a rate as a standard for exchange of each type of currency to one point are displayed on an exchanging currency selection screen. A standard number of points converted to one US dollar, one European euro, and one Chinese yuan, for example, is displayed, making it easy to understand transaction conditions under succeeding sales transaction status. Moreover, for example, point exchange conditions are displayed as a list and confirmed, thereby allowing specification of one's own exchange conditions, and allowing exchange of points etc. based on specification of accepted exchange conditions.

2 Claims, 11 Drawing Sheets

(56) References Cited

U.S. PATENT DOCUMENTS

| | | | | |
|---|---|---|---|---|
| 2002/0026354 | A1* | 2/2002 | Shoji | G06Q 30/02 705/14.19 |
| 2002/0077890 | A1* | 6/2002 | LaPointe | G06Q 30/02 705/14.28 |
| 2005/0096990 | A1* | 5/2005 | Algiene | G06Q 20/04 705/21 |
| 2005/0154674 | A1* | 7/2005 | Nicholls | G06Q 20/04 705/43 |
| 2005/0216398 | A1* | 9/2005 | Powers | G06Q 10/10 705/39 |
| 2006/0074745 | A1* | 4/2006 | Shiomi | G06Q 30/02 705/14.27 |
| 2006/0151600 | A1* | 7/2006 | Kimura | G06Q 30/06 235/383 |
| 2006/0167744 | A1* | 7/2006 | Yoo | G06Q 30/02 705/14.19 |
| 2007/0080209 | A1* | 4/2007 | Fujita | G06Q 20/06 235/380 |
| 2007/0233568 | A1* | 10/2007 | Pou | G06O 20/10 705/14.27 |
| 2009/0089168 | A1 | 4/2009 | Schneck | |
| 2009/0150288 | A1* | 6/2009 | Bishop | G06Q 20/10 705/44 |
| 2010/0211495 | A1* | 8/2010 | Zanzot | G06Q 20/04 705/37 |
| 2011/0004558 | A1 | 1/2011 | MacLean et al. | |
| 2011/0218884 | A1* | 9/2011 | Kothari | G06Q 30/02 705/27.1 |
| 2012/0095820 | A1 | 4/2012 | Shukla et al. | |
| 2012/0303425 | A1* | 11/2012 | Katzin | G06Q 20/027 705/14.4 |
| 2013/0030891 | A1* | 1/2013 | Heffernan | G06Q 30/02 705/14.15 |
| 2013/0218657 | A1* | 8/2013 | Salmon | G06Q 10/00 705/14.29 |
| 2014/0006297 | A1* | 1/2014 | Hogg | G06Q 10/101 705/319 |
| 2014/0012754 | A1* | 1/2014 | Hanson | G06Q 20/40 705/44 |
| 2014/0075502 | A1* | 3/2014 | Aissi | G06F 21/60 726/1 |
| 2017/0286990 | A1* | 10/2017 | Kikuchi | G06Q 30/0233 |

FOREIGN PATENT DOCUMENTS

| | | |
|---|---|---|
| JP | 2009-211473 A | 9/2009 |
| JP | 2009-217702 A | 9/2009 |

OTHER PUBLICATIONS

PCT Application No. PCT/JP2015/070627, Written Opinion of the International Searching Authority, dated Dec. 15, 2015 (Japanese).
PCT Application No. PCT/JP2015/070627, International Preliminary Report on Patentability, dated Jun. 27, 2017 (English).
PCT Application No. PCT/JP2015/070627, International Preliminary Report on Patentability, dated Jun. 27, 2017 (Japanese).
English language Abstract of Japanese Application Publication No. 2008-269283 A, Creansmaerd Co., Ltd., Published Nov. 6, 2008.
International Search Report for PCT Application No. PCT/JP2015/070627, dated Dec. 15, 2015.

* cited by examiner

POINT MANAGEMENT SYSTEM AND POINT MANAGEMENT METHOD

TECHNICAL FIELD

The present invention relates to an information processing system and an information processing method that facilitate and activate point management among different points in a market that allows individual trade of points serviced by manufacturers according to a customer's use.

BACKGROUND ART

In the past, there have been many point plans that give points according to customer's use results or purchase results in various industries, and that allow the customers to exchange them for a specified product in accordance with acquired points, to purchase a product using the given points, or to receive provision of specific services.

DISCLOSURE OF THE INVENTION

Problem to be Solved by the Invention

However, recently, many businesses in various industries have different point plans, and a user has to use points for each corresponding business so as to enjoy benefits etc. Meanwhile, it is usual that an expiration date is set for the earned points belonging to each business, and when many points are accumulated, the point expiration date may pass and the points may become void without being used.

Therefore, the user must always have the same number of cards as corresponding businesses, and thus it is troublesome to manage those many cards effectively where some of which may expire and some of which may not have enough points for a desired product/service, etc. Moreover, lately, the same point services in many industries as well as airline company points are circulated even in foreign countries, and there are increasing cases where points can be acquired in foreign countries. However, in such cases, point expiration occurs more frequently.

The present invention has been devised in light of the above problems, and makes it possible to exchange points for points obtained based on multiple point plans, and to exchange in the same manner for points acquired from foreign countries as well as point plans of Japan.

The present invention aims to provide a point exchange method allowing exchange of points among different users by utilizing a network system etc.

Means of Solving the Problem

The present invention aims to resolve the above problem, and provides the following configuration, for example, as a means of resolving said problem.

That is, a point management system according to the present invention is characterized by comprising a currency exchange rate acquisition means for acquiring a foreign exchange rate for a specific foreign currency, and allowing transfer of points belonging to a point group, which allows customers to enjoy a benefit using points acquired by a customer, to another customer; said point management system further comprising: specify means for specifying an exchange condition for carrying out the transfer of points belonging to the point group by exchanging the points for other valuables other than the points; exchange condition display means for displaying the exchange condition specified by the specify means, so as for the customer to determine whether or not exchange is to be carried out; valuables detection means for detecting the type of the valuables selected to be exchanged by the customer by confirming the exchange condition displayed by the exchange condition display means; and foreign exchange rate display/output means for displaying/outputting in a recognizable manner the foreign exchange rate acquired by the currency exchange rate acquisition means when the valuables detection means has detected selection of a foreign currency as valuables; wherein point exchange for the foreign currency is allowed by confirming the exchange condition for the foreign currency.

A point management system according to the present invention is characterized by comprising a currency exchange rate detection means for detecting a foreign exchange rate for a foreign currency, and adding up points acquired by a customer and allowing transfer of points belonging to a point group, which allows customers to enjoy a benefit using the added-up points, to another customer; said point management system further comprising: specify means for specifying an exchange condition for carrying out the transfer of points belonging to the point group by exchanging the added-up points for other valuables; exchange condition display means for displaying the exchange condition specified by the specify means, so as for the customer to determine whether or not exchange is to be carried out; valuables detection means for detecting the type of the valuables desired to be exchanged by the customer by confirming the exchange condition displayed by the exchange condition display means; and foreign exchange rate reflection/display means for automatically calculating the number of points to be exchanged so that when selecting points issued in a foreign country as the valuables, the foreign exchange rate of the foreign currency detected by the currency exchange rate detection means is reflected on the number of points to be exchanged, and displaying the point exchange condition on which change in monetary value is reflected; wherein point exchange for the points issued in a foreign country is allowed.

For example, the exchange condition display means specifies the exchange condition for points to be exchanged, thereby allowing specification of customer's own exchange condition while taking another customer's exchange condition into consideration. For example, the valuables include electronic money. For example, the valuables include game points usable for games or include digital tickets including concert tickets, admission tickets, utilization tickets, and exchange tickets.

Furthermore, for example, the present invention is characterized by further comprising: point exchange establishment status determination means for determining an establishment status for transfer of points belonging to a point exchange applicant; and point exchange condition output means for presenting a predetermined point exchange condition in accordance with determination results of the point exchange establishment status determination means; wherein a point exchange under the condition presented by the point exchange condition output means is allowed.

A point management method of a point management system according to the present invention that adds up points acquired by a customer and allows transfer of points belonging to a point group, which allows customers to enjoy a benefit using the added-up points, or allows transfer of game points usable for game execution, to another customer; said method is characterized by comprising the steps of: carrying out the transfer of points belonging to the point group by exchanging the points for other valuables other than the points, and specifying an exchange condition for the valuables to be exchanged for the points; disclosing the specified exchange condition so as for the customer to determine whether or not exchange is to be carried out according to the specified exchange condition; and enabling selection of a foreign currency as the valuables, outputting in a recognizable manner a foreign exchange rate to the foreign currency, and enabling reflection of the foreign exchange rate on the exchange condition for the foreign currency.

A point management method of a point management system according to the present invention that adds up points acquired by a customer and allows transfer of points belonging to a point group, which allows customers to enjoy a benefit using the added-up points, to another customer; said method is characterized by comprising the steps of: carrying out the transfer of points belonging to the point group by exchanging the points for other valuables other than the points, and specifying an exchange condition for the valuables to be exchanged for the added-up points; disclosing the specified exchange condition so as for the customer to determine whether or not exchange is to be carried out according to the specified exchange condition; and calculating automatically the number of points to be exchanged so that when selecting points issued in a foreign country as the valuables, the foreign exchange rate of the foreign currency is reflected on the number of points to be exchanged, and enabling specification of the exchange condition on which change in monetary value is reflected.

Even further, for example, the point management method according to the present invention, further comprising the steps of: displaying all of the exchange conditions for points to be exchanged; and allowing specification of customer's own exchange condition while taking another customer's exchange condition into consideration.

For example, the foreign exchange rate is reflected on the exchange condition when exchanging points using the foreign currency, and the valuables include electronic money.

Yet even further, for example, the point management method according to the present invention, further comprising the steps of: determining an establishment status for transfer of points belonging to a point exchange applicant; and presenting a predetermined point exchange condition in accordance with the determination results; wherein point exchange under the predetermined point exchange condition is made possible.

Results of the Invention

According to the present invention, a point management system and a point management method allowing effective use of points acquired by a customer, and prevention of a waste in points are provided.

DESCRIPTION OF EMBODIMENTS

An embodiment of the present invention is explained with reference to drawings hereafter. In the following embodiment, partnership with multiple point groups etc., and exchange of points belonging to each partnering point group for other points or electronic money, etc. are allowed, so that effective use of points will be attained. Note that the embodiment carries out the point exchange process, wherein a fixed rate handling fee according to the content of each exchange transaction is collected.

Moreover, the embodiment allows use of not only these points, but also game points usable for games. Furthermore, it allows exchange using cash, exchange of various points for digital valuables (digital marketable assets), exchange of points for digital tickets, exchange of points for various utilization tickets for vehicles (railway, airplanes, ships, cable cars, ropeway, etc.) etc.

Figure 1:
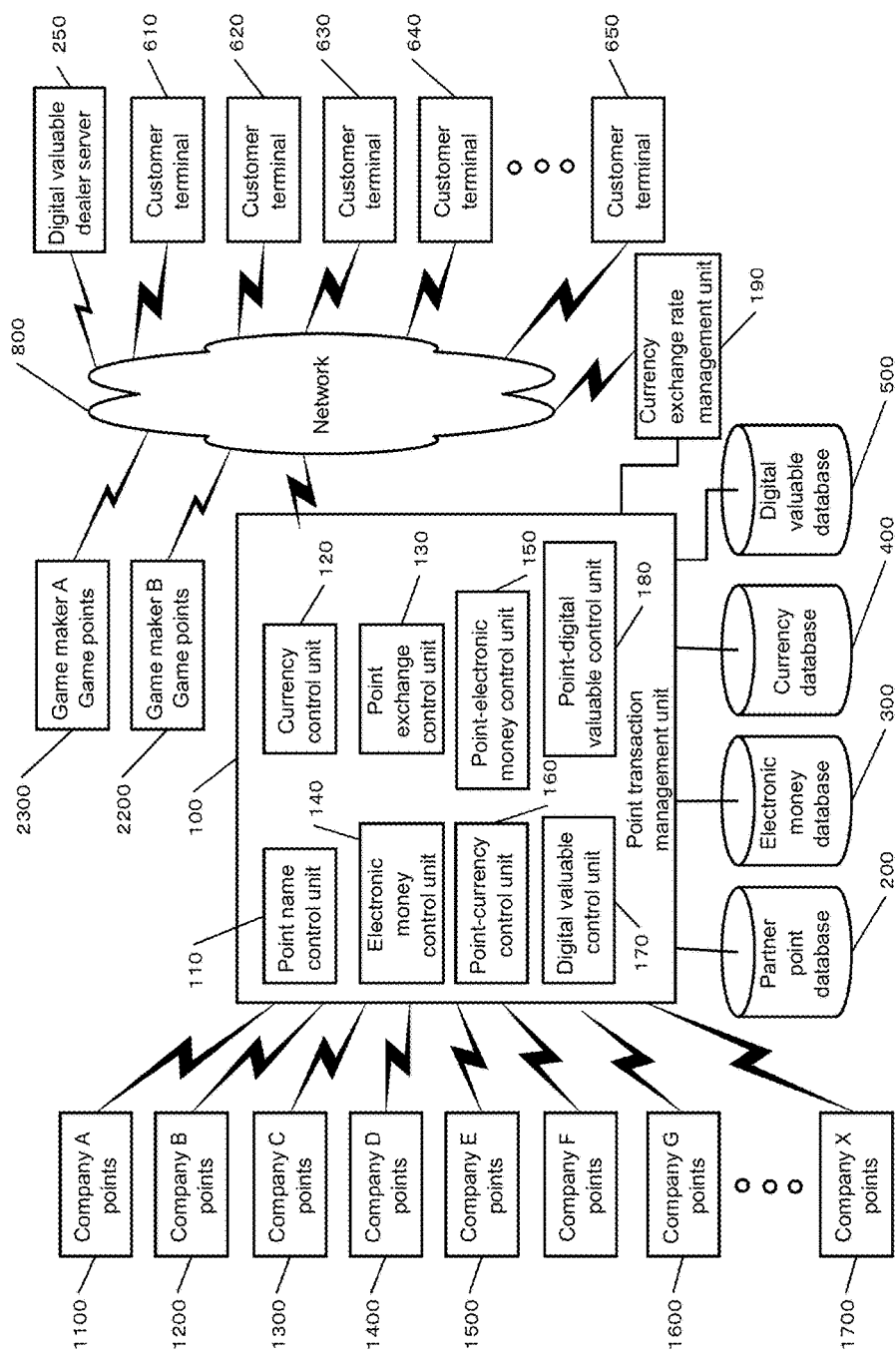
FIG. 1 is a block diagram illustrating a configuration of a point management system of an embodiment according to the present invention.

First, an outline of a point management system of the embodiment is described with reference to FIG. 1. FIG. 1 is a block diagram illustrating a configuration of the point management system of the embodiment according to the present invention.

In FIG. 1, reference numeral 100 denotes a point transaction management unit for controlling the entire point management system of the embodiment, and has the following configuration, for example.

The point transaction management unit includes a point name control unit 110 for exchanging information with respective partnering point service group companies and carrying out common management of point information of partner companies, a currency control unit 120 for collecting foreign exchange information among currencies in international transactions and controlling point exchange rates, a point exchange control unit 130 for controlling point exchange between applicants each having points belonging to different partnering point group companies, an electronic money control unit 140 for controlling electronic money of a registered user (member), and a point-electronic money control unit 150 for controlling exchange between electronic money and points of the partnering point group companies according to a desire for exchange between points of each partnering point group company and the registered user's electronic money.

Moreover, the point transaction management unit includes a point-currency control unit 160 for controlling exchange between points of partnering point group companies and available currency according to a desire for exchange between points of each of the partnering point group companies and the registered user's currency, a digital valuable control unit 170 for controlling digital valuables of a partnering person (member), and a point-digital valuable control unit 180 for controlling exchange between points of the partnering point group companies and digital valuables according to a desire for exchange between the points of each of the partnering point group companies and the registered user's digital valuables.

Furthermore, the point-electronic money control unit 150, the point-currency control unit 160, and the point-digital valuable control unit 180 not only have a function of controlling exchange for points, but also have a function of controlling exchange for other exchange objects.

The digital valuables handled by the digital valuable control unit 170 of the point transaction management unit 100 may include all valuables in a format that can be exchanged over the Internet, including game points usable for a game, for example. Yet even further, for example, the valuables (marketable assets) are digital tickets etc. including concert tickets, admission tickets, utilization tickets, exchange tickets, etc. Yet even further, exchange for other negotiable securities is also possible.

The point transaction management unit 100 has a partner point database 200 for registering information, such as information of points of a partnering point group belonging to registered members, and game points managed by a game manufacturer, etc., an electronic money database 300 for registering information of electronic money possessed by the registered members, a currency database 400 for registering information of currency deposited by the registered members, and a digital valuable database 500 for registering information of digital valuables possessed by the registered members.

Moreover, in addition to the above respective databases of the point information, electronic money information, and currency information, various information of negotiable securities are registered in the digital valuable database 500, thereby allowing exchange of information of the following respective valuables etc. The valuables that can be registered in the digital valuable database 500 include 'digital tickets', 'digital gift vouchers', 'airplane tickets', 'utilization tickets for games or contents', 'vehicle tickets', 'ship tickets', etc., for which points can be exchanged.

In these respective databases, not only present time possessor information of various objects possessed by each registered member is registered, but also history information for a fixed period, information of whether or not exchange for another person's possessions is desired, and objects to be exchanged and desired exchange conditions according to a desire for exchange are associated with one another and registered. When disagreement of the desired exchange conditions of the registered members is within a fixed range, participation in an exchange matching process with other exchange applicants described later occurs.

Moreover, the unit 100 has a currency exchange rate management unit 190 for updating foreign exchange rate information obtained from an exchange clearing house etc. via a network 800 so as to acquire the updated foreign exchange rate (currency exchange rate), and for managing the acquired foreign exchange rate.

Furthermore, transmission and reception of the point information acquired by the registered users is carried out between partnering point companies (respective partnering point companies) 1100 to 1700 (Company A to Company X). Of the game point information acquired by registered game players, game point information of a registered user registered in the system of the embodiment is transmitted and received between partnering game manufacturing companies 2200 and 2300 via the general network 800, and the acquired point information is registered in the partner point database 200.

A digital valuable dealer server 250, which allows the registered members to acquire various digital valuables described in detail later via the network 800, is also connected to the network 800, and in the case where a customer desires to exchange a digital valuable acquired by him/her for acquired points, for example, the digital valuable to be exchanged is registered in the digital valuable database 500. More specifically, for example, it is structured such that classification of digital valuables desired to be exchanged, exchange conditions, and exchange applicant information are associated, registered member information is also associated and registered, and retrieval is possible.

Transmission and reception of various information can be carried out between the point transaction management unit 100 and terminals (customer terminals) 610 to 650 belonging to affiliated users (members). The respective terminals are constituted by personal computers, mobile phones, smart phones, mobile tablet terminals, game terminals etc. that can perform information transmission.

With the embodiment, as described above, application to online games that have recently had an increase in users has been explored without being limited to handling of shopping points. There is an increase in those that allow users to purchase predetermined game execution points in advance in order to execute such a game (online game), and then to execute the game within the range of the acquired points.

Among such games, even though points are not required in the beginning, there are many games provided in forms allowing acquisition of points during the progress of the game, and allowing exchange for items that can advantageously progress the game according to the acquired points. There are many cases where with this type of game, separate purchase of points allows advantageous progression of the game.

In most cases, the points available for such game can only be used in a specific game and cannot be applied to other games. Therefore, points for a specific game not played anymore cannot be used and are essentially thrown away.

In light of this problem, and considering how to effectively use the unneeded points, the embodiment allows exchange of the points usable for a specific game for points for another game, points belonging to another point group, or negotiable securities, etc.

As a result, more users can effectively use points. At this time, by allowing exchange for all sorts of currency and for negotiable securities described above when allowing purchase by cash or use of negotiable securities, use of user's points in a wider area of across the world is also implemented.

This will be described in more detail below. Since usable points also include game execution points described later, merely adding game points to the usable points enables exchange for points of any other game, exchange for points of any other point operating company, exchange for electronic money, or exchange for foreign currency etc. in the same manner as for other points.

Next, with the embodiment having the above configuration, an example of controlling exchange between a registered user's points and other valuables is described. However, the embodiment also makes it possible to exchange between valuables other than points, as well as exchange of points for another valuable. In this case, a selection bar displayed on the trade top screen is a selection bar for indicating exchange of a selected valuable desired to be exchanged for another valuable to be exchanged.

First, a member registration process for registering as a member, a user wanting to receive a point service provided in the embodiment is described with reference to FIG. 2. Once the trade top screen is displayed when a customer terminal, such as the customer terminal 610, accesses the point transaction management unit 100 of the embodiment, the customer is allowed to select what to exchange for his/her own points by clicking a button displayed on the upper part of the screen. There are many cases where these points are acquired at a predetermined rate when the customer purchases a product from a store or a member store of a corresponding point group or receives provision of services.

Figure 2:
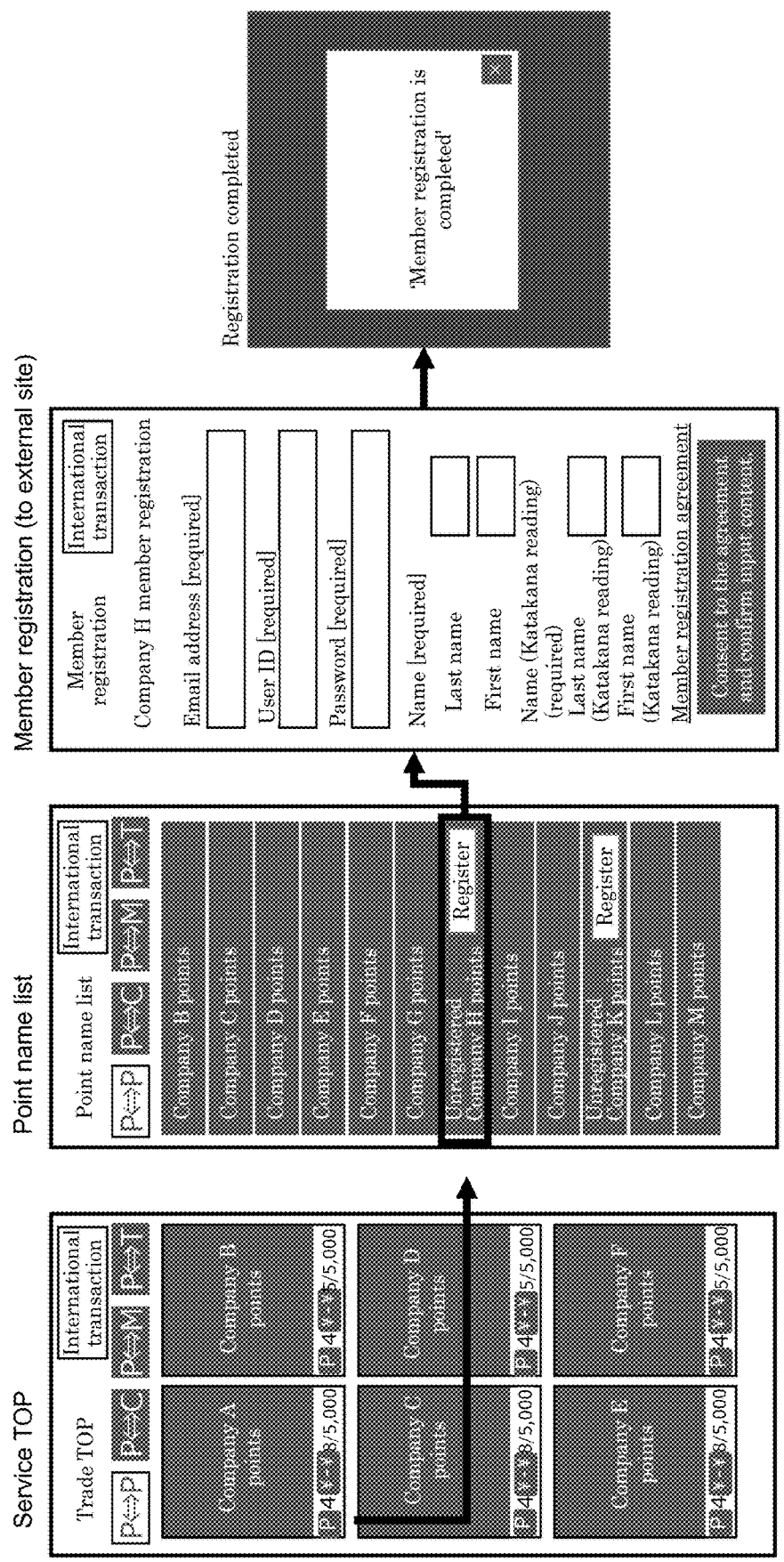
FIG. 2 is a diagram for describing a registration process for a partnering point service group of the embodiment.

On the trade top screen of FIG. 2, an international transaction button for specifying whether to carry out an international transaction is displayed in the upper part, and in the lower part are displayed a 'P⇔P' button for instructing exchange of points for other points, a 'P⇔C' button for instructing exchange of points for cash, a 'P⇔M' button for instructing exchange of points for electronic money, and a 'P⇔T' button for instructing exchange of points for another valuable such as a digital ticket etc.

In the case of exchanging one's own points for another person's points, the 'P⇔P' button on the left end is selected. When the point exchange process is selected, the 'P⇔P' button will be reverse displayed on the top screen shown on the top left side of FIG. 2, and information of each partnering point company that allows exchange of points at this time is displayed.

When a 'P' button of a Company A selection icon displayed in the upper right row on a service top screen in the left end part of FIG. 2 is selected, and point-point (P-P) exchange for exchanging one's own Company A points for another person's points is selected, a point name list screen which is second from the left in FIG. 2 is displayed. This display not only can be controlled by presetting so as to only display a preset number of point service groups, but also to display many possible groups across the entire screen, as illustrated in FIG. 2.

When all of the exchange points belonging to the partnering point groups cannot be displayed on this screen, all of those exchange points can be displayed by moving up the screen (scrolling up the screen) or the like so as to change the screen. For example, it may be controlled to preferentially display a point group that has just carried out an exchange. Moreover, it is also possible to display game manufacturers (games) allowing exchange of game points, and if a game is then specified, exchange of points of the specified game for other points or currency etc. is possible.

Note that when the 'P⇔C' button in the middle of the upper row of the point name list screen is selected, an exchange screen for the possessed points and cash is displayed, and when the 'P⇔M' button on the right side of the upper row is selected, an exchange screen for the possessed points and electronic money is displayed. Each of these screens is displayed on the screen of the customer terminal that has accessed the point transaction management unit 100, and the user operates his/her own terminal to carry out the point exchange process of the embodiment.

The point name list screen which is second from the left in FIG. 2 is displayed on the screen of the accessing customer terminal. Information of each of the point companies allowing point exchange etc. is displayed here, and in the case of FIG. 2, information of the first 12 companies, for example, from Company B to Company M is displayed. Therefore, the registered member selects a point group with which exchange is desired. For example, in the case where exchange with Company A points is desired, the desired point group is selected on the point name list screen.

Referencing the point name list table, a user may have already made a contract with the target point group to use points, and/or the group name of the point group clearly expressing an intent of carrying out point exchange may be displayed, and when a button on which the group name is displayed is selected, a point exchange screen for the Company A points and points belonging to the selected point group is displayed. This point group also includes an online game manufacturer, and game points are objects to be exchanged in this case.

Here, the point name control unit 110 accesses each partner company so as to confirm whether it is the point group with which the operating user has a contract. Partnering point groups that have not exchanged points until now are displayed as 'unregistered'. For example, in the example of FIG. 2, Company H and Company K have been determined as not being registered in the system of the embodiment. Therefore, when transaction with an unregistered point group is desired, such as when transaction with the unregistered Company H shown in FIG. 2 is desired, 'Register' on the 'Unregistered Company H points' button is selected.

Through this selection, a member registration (to an external site) screen of FIG. 2 is displayed, and processing of registration with the Company H point group is carried out. With the embodiment, the point name control unit 110 accesses the points of Company H, displaying the member registration screen for Company H. While the registration screen differs according to point group, registration with said point group is carried out by entering in each input field a member email address (for ensuring a means of contact), a user ID, a password freely decided by a registered member, name (first and last names) and kana pronunciation of the name, and then by transmitting them. Note that in this case, consenting to registration regulations (terms of use) for the point group is required. In the example of FIG. 2, registration information is transmitted to said point group and received by it so as to carry out member registration, and a confirmation screen shown on the right end of FIG. 2 for confirming that the member registration process is complete is displayed.

Next, a process for selecting an object of trade is described with reference to FIG. 3. As described above, the embodiment has a configuration allowing a point-point exchange process for exchanging a user's points (the following description is of an example of acquiring yen-based points without selecting the international transaction button.) for another person's acquired points, a point-cash exchange process (a point-currency exchange process) for exchanging a user's points for cash, and a point-electronic money exchange process for exchanging a user's points for electronic money.

Note that while there is also exchange of the user's point for another person's valuable such as a digital ticket, when the 'P⇔T' button is selected, a digital ticket, a vehicle ticket, a ship ticket, an airplane ticket, etc. desired to be exchanged for points is displayed.

Figure 3:
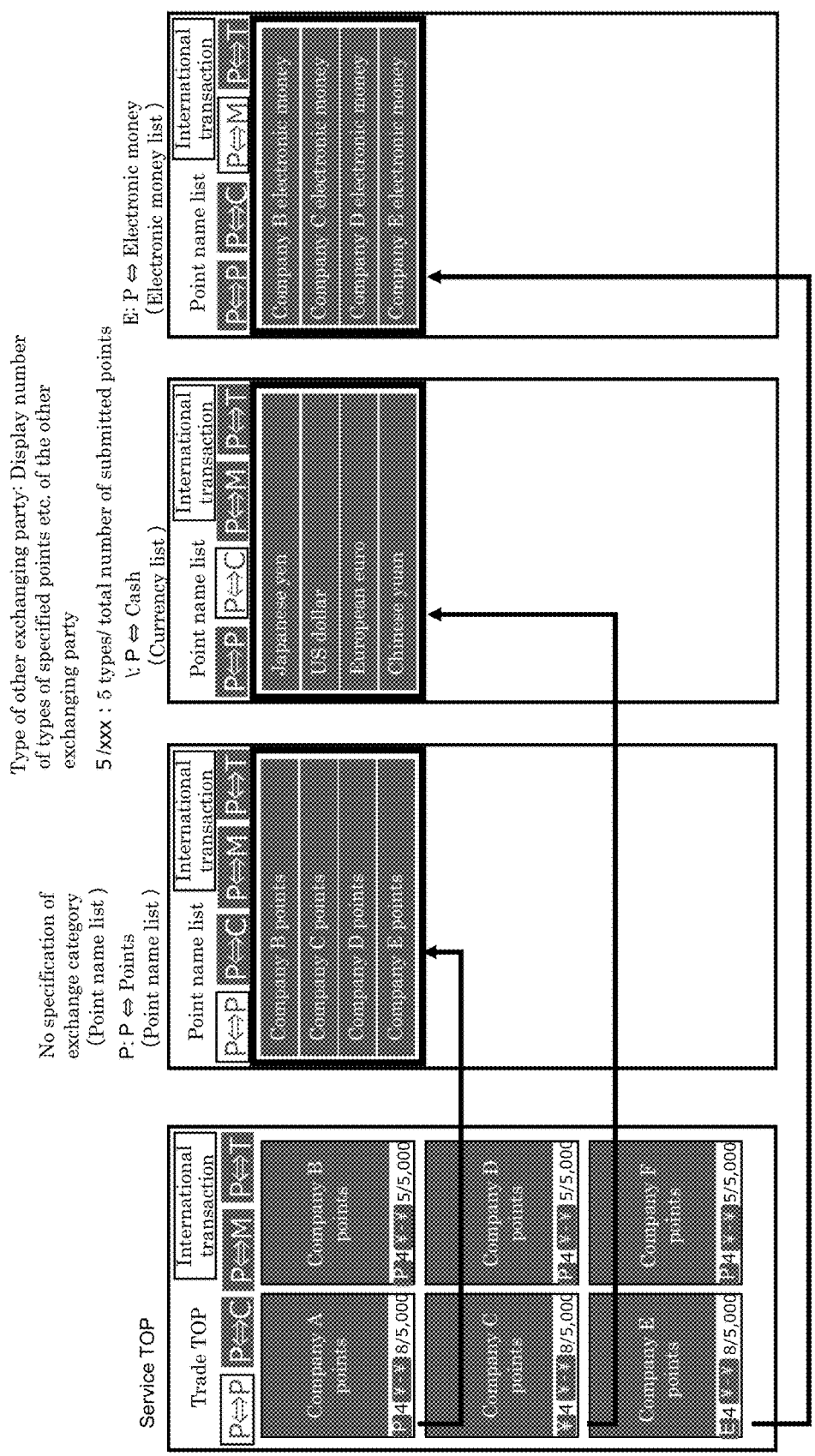
FIG. 3 is a diagram for describing a selection process for an object of trade of the embodiment.

In the example of FIG. 3, a button for selecting a transaction allowing exchange of points is displayed in the lower left region of each company's point selection region on the service top screen (left end part). For example, 'P' is displayed in the case where a point-point exchange is possible, '¥' is displayed in the case where a point-currency exchange is possible, and 'E' is displayed in the case where a point-electronic money exchange is possible. This display is controlled such that they can be displayed successively; however, in the case where there are no point exchange objects, the display form may be changed to another display form which allows easy recognition of that case.

FIG. 3 illustrates an example where 'P' is displayed in the upper left of the service top screen, '¥' is displayed in the middle left of the screen, and 'E' is displayed in the lower left of the screen. Here, when the 'P' button in the upper left is selected, the point name list screen which is second from the left in FIG. 3 is displayed. As given on the point name list screen, the point groups that allow exchange with the Company A points are displayed. Four companies are displayed in the example of FIG. 3 but are not limited thereto. When a game manufacturer is registered, game points available for executable games are included.

Even when the '¥' button in the middle left of the service top screen is selected, processing can proceed to the point-cash exchange process. Then the currency list screen which is second from the right in FIG. 3 is displayed. As given on the currency list screen, 'Japanese yen', 'Us dollars', 'European euro', and 'Chinese yuan' are displayed as exchangeable currency for the Company A points. Four currencies are displayed in the example of FIG. 3 but are not limited thereto.

If the 'P⇔M' button is selected when the 'E' button in the lower left of the service top screen is selected, the electronic money list screen which is in the right end part of FIG. 3. As given on the electronic money list screen, the four companies that allow exchange electronic money for the Company A points are displayed. Electronic money of the four companies is displayed in the example of FIG. 3 but is not limited thereto.

When a bar of a desired exchange is selected on any one of the list screens, an exchange detail screen is displayed.

Next, an exemplary display of a target point group on the service top screen of the embodiment is described with reference to FIG. 4. On the service top screen, the total number of people wanting to exchange points belonging to said point group and the number of exchangeable points are displayed in a lower right region of the point selection region of each company. The exemplary display of the 'Company A points' display region in the upper left row of FIG. 4 reads '8/5000', and the lower right row illustrates an example of displaying '5/5000'.

Figure 4:
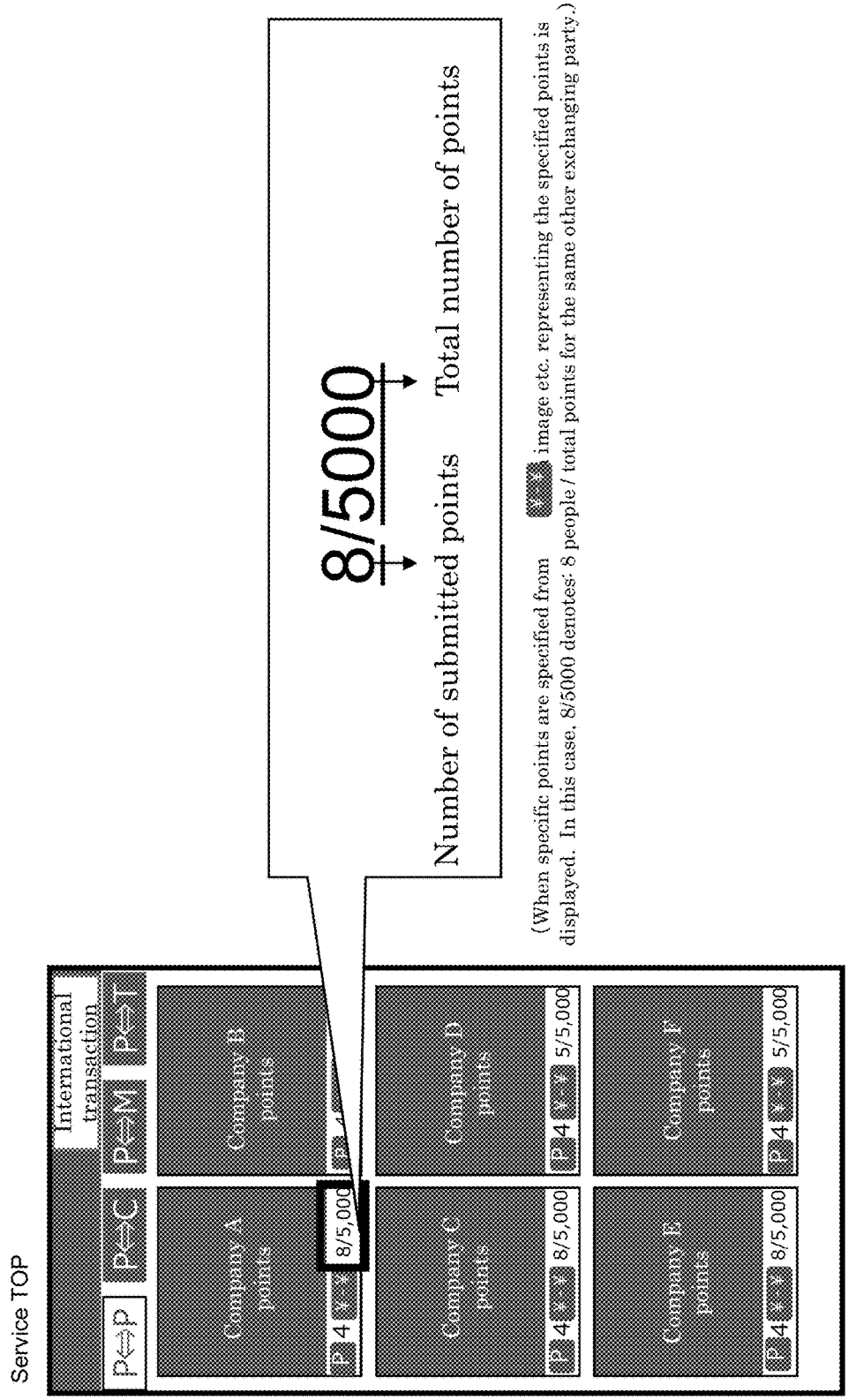
FIG. 4 is a diagram for describing an exemplary display at the time of exchanging points of the embodiment.

For example, '8/5000' in the upper left row indicates that the total number of points (total points for the same other exchanging party) for '8' submissions to be point-exchanged is 5000 points, as illustrated on the right side of FIG. 4. It is configured in such a manner as to allow confirmation of the number of point submissions and the total number of points desired to be exchanged on the service top screen.

Next, details of a transaction allowing point exchange and a point exchange process of the embodiment are described with reference to FIG. 5. The point-point exchange process of the embodiment is described first. As described above, a 'P⇔P' button for shifting to the point name list screen is displayed on the upper row left side of the service top screen, a 'P⇔C' button for shifting to the currency list screen is displayed in the middle of the upper row, and a 'P⇔M' button for shifting to the electronic money list screen is displayed on the upper row right side. When one of the buttons is selected, the corresponding transaction condition setting screen is displayed so as to proceed to a screen for exchange of possessed points for a selected point value, currency, electronic money, or valuable such as a digital ticket, etc.

Figure 5:
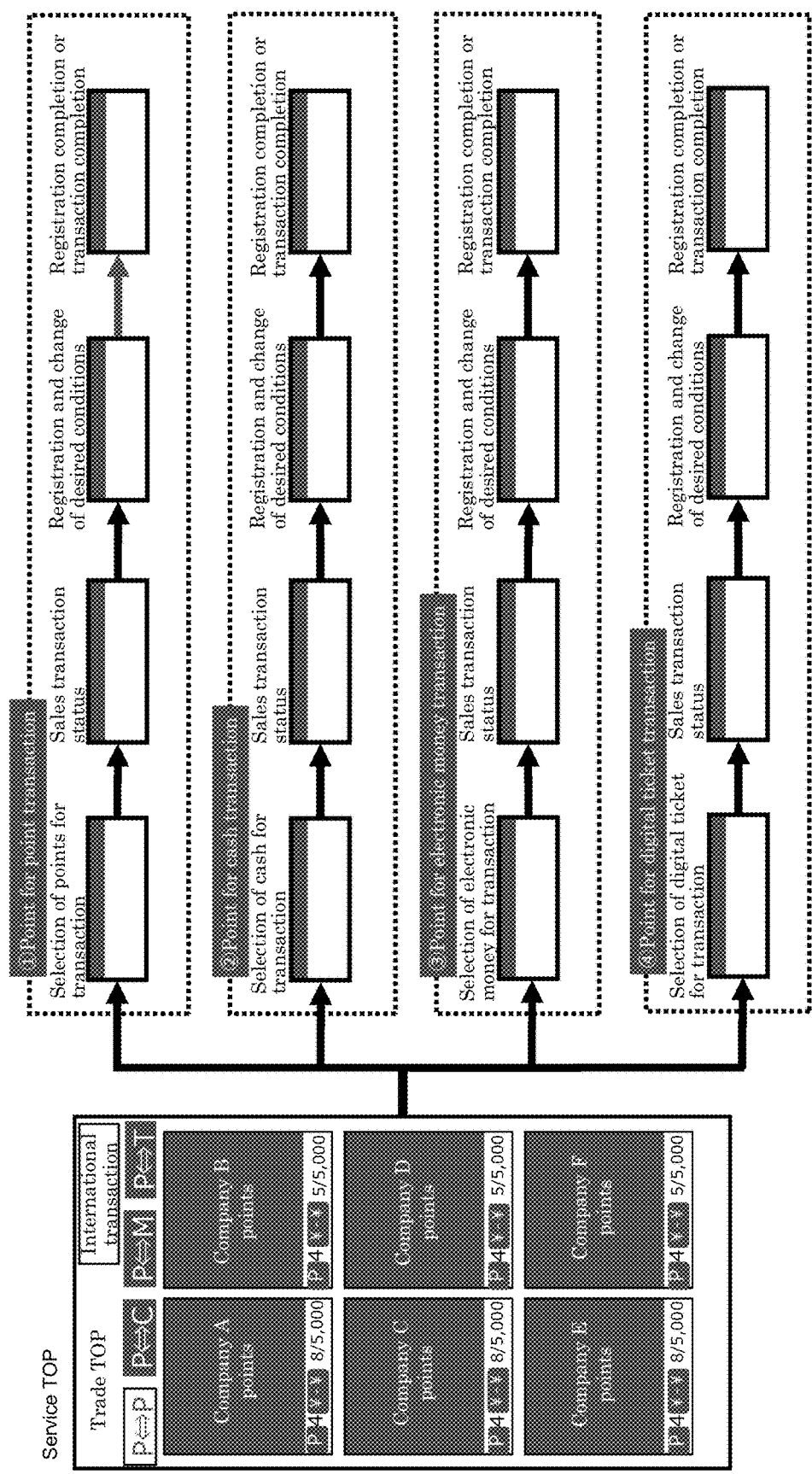
FIG. 5 is a diagram for describing types of available point exchange according to the embodiment.

The top part on the right side of FIG. 5 illustrates a flow of the point-point exchange process. Points desired to be traded are first selected. For example, a point name list is displayed so as to allow selection of a point service (e.g., Company B points) that is desired to be exchanged for one's own acquired points, for example, Company A points. Then a transaction status (transaction condition) screen described later is displayed, on which are displayed the exchange conditions of the other party desiring to exchange and the point effect conditions of another person who wants to exchange the same points in the control of, for example, the point transaction control unit 130. User confirms this display and aims to exchange the points by registering desired exchange conditions and/or changing the desired exchange conditions. When the registered exchange conditions of two people wanting to exchange points match as a result, a point exchange transaction is established, the points are exchanged, and the transaction is completed.

Figure 6:
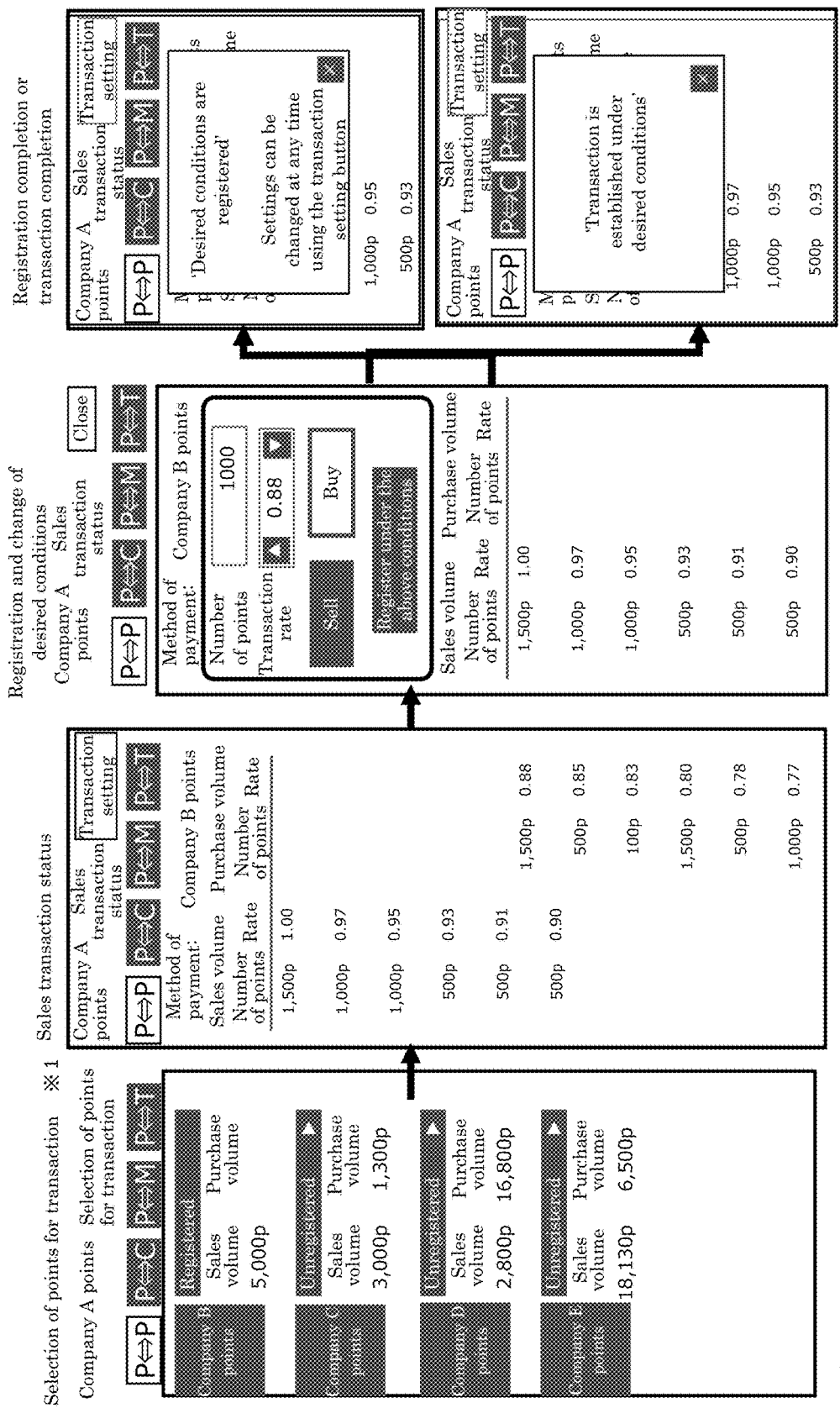
FIG. 6 is a diagram for describing a point exchange process of the embodiment.

Details of the above point exchange process is described with reference to FIG. 6. FIG. 6 is a flowchart for describing details of the point-point exchange process.

In FIG. 5, when trying to exchange the Company A points for points belonging to another company, for example, the Company B point group, the Company B points are selected on the point name list screen. Processing proceeds to the flow illustrated in FIG. 6, and then the sales transaction status screen which is second from the left in FIG. 6 is displayed.

This is a transaction carried out between the Company A points and the Company B points, and point exchange conditions (transaction conditions) of the person possessing the Company B points wishing to exchange with the Company A points are displayed.

The example of FIG. 6 shows that six conditions are specified as point exchange conditions; wherein exchange of 1500P at a point exchange rate of '1' is desired, exchange of 1000P at a point exchange rate of '0.97' is desired, exchange of 1000P at a point exchange rate of '0.95' is desired, and exchange of 500P at a point exchange rate of '0.93' is desired. Furthermore, exchange of 500P at a point exchange rate of '0.91' is desired, and exchange of 500P at a point exchange rate of '0.90' is desired.

In FIG. 6, a desired transaction volume list for users wanting to buy the Company B points is displayed, and it is possible to confirm this list and buy using a method described later. Aside from this list, a transaction with game points is possible by the same procedure.

Exchange conditions for the Company A points are set with reference to this sales transaction status screen. A screen which is second from the right in FIG. 6, is an exemplary desired condition setting input screen. When the number of exchange points is entered on this screen, the transaction rate is set using a down arrow button and an up arrow button, and 'Register under this condition' is clicked to register the condition, a display to the effect that registration of the desired condition is completed is sent back, as illustrated on the right side upper row of FIG. 6, for example.

When the transaction is completed under the desired condition, a confirmation email to the effect that the transaction has been established as shown on a screen on the right end left side of FIG. 6 is sent. Note that the transaction condition is displayed in a confirmable manner in the lower part of the previous input screen, and when the displayed condition is satisfactory, the transaction under this condition is established.

The example of FIG. 6 illustrates a case of exchange between points issued in Japan and points issued in the same. However, the embodiment is not limited to the points issued in Japan, and exchange of points even for points issued by point groups in other countries is possible in the same manner.

A point exchange process when exchanging points issued in a foreign country for points issued in Japan is described. Even for points issued in a foreign country, the basic operation is exactly the same. However, in the case of exchanging for points issued in a foreign country, a fixed point exchange rate causes changes in the value thereof, resulting in lack of equity for users.

Therefore, in the embodiment, the point exchange rate is automatically calculated according to a currency exchange rate and is then displayed. Here, an example of a case where points issued by a business in the United States estimating the value of one dollar to 100 points, for example, are desired to be exchanged for points issued in Japan, and where the currency exchange rate management unit 190 confirms the latest exchange rate, which is one dollar to 103 yen, is described. Supposing that an operator of the system according to the embodiment collects, for example, 3 yen per dollar as a foreign exchange commission, and that the above described exchange rate is '1.00', and that '100 points' out of the points issued in the United States are to be exchanged for Japanese points, exchange for '10000 points' issued in Japan is a condition of the trade.

The above foreign exchange commission is not limited to this example, where what percentage of the exchange is to be set as the commission may be determined according to type of currency, or a fixed rate may be added to the point exchange fee collected at the time of a normal point exchange.

In this manner, the embodiment, at the time of an exchange between the points issued in Japan and points issued in a foreign country, calculates the respective values of both points automatically in accordance with the currency exchange rate and then displays the values (for example, the value of the foreign country points is converted to a point value in the case of exchanging for Japanese points), thereby allowing users to confirm the display to decide to trade, and to exchange points with both parties being sufficiently satisfied.

In the case of a point-cash transaction as illustrated in the right side second row of FIG. 5, selection of cash for transaction is made, and once the cash type is specified, confirmation of a sales transaction status for the cash type is carried out.

When processing continues to proceed, registration or change of a desired condition of this side of the transaction is carried out. If the exchange conditions match, a confirmation email to the effect that the transaction has been established as is shown on the right end lower side screen of FIG. 6 is sent.

Details of this point-cash (currency) exchange process is described with reference to FIG. 7.

Figure 7:
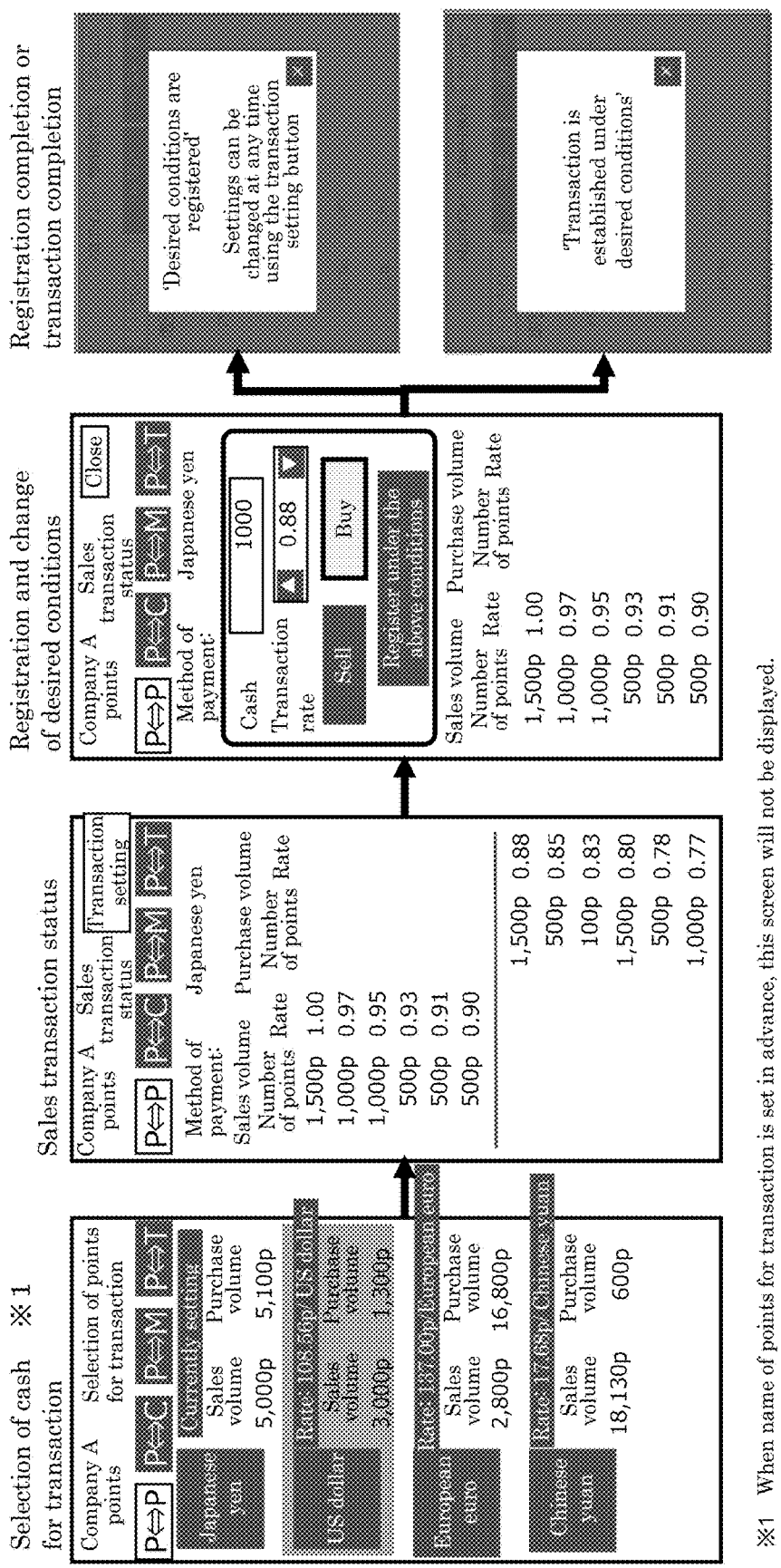
FIG. 7 is a diagram for describing a point-currency exchange process of the embodiment.

FIG. 7 is a flowchart for describing the details of the point-cash exchange process. In FIG. 7, when trying to exchange the Company A points for cash, the Company A points are selected on the service top screen, and the 'P⇔C' button that is in the middle of the upper part is then selected, type of currency (cash) for transaction, which is shown on the left side of the screen in the left end part of FIG. 7, is then selected.

Here, the number of points desired to be traded is displayed based on each type of currency, and a point exchange rate for one point of Company A as a standard for exchange for each currency is displayed. The example of FIG. 7 displays that: on the basis of US dollars, a standard number of points when converted to one dollar is 108.56 points as a point exchange rate for dollars; on the basis of European euros, a standard number of points when converted to one euro is 137.00 points as a point exchange rate for euros; and on the basis of Chinese yuan, a standard number of points when converted to one yuan is 17.68 points as a point exchange rate for yuan; thereby making it easy to understand transaction conditions under sales transaction status that will be shown in the next step.

If any one of these types of currency is selected at this time, processing proceeds to the flow indicated towards the right side of FIG. 7, and then the sales transaction status screen which is second from the left in FIG. 7, is displayed.

Here, as an example of a transaction of buying Company A points using Japanese Yen, point exchange conditions (transaction conditions) for a person wanting to exchange cash (Yen) for the Company A points is displayed.

Six conditions are specified as point exchange conditions in the example of FIG. 7. The conditions are: a desire to exchange 1500P for yen at a point exchange rate of '1', a desire to exchange 1000P for yen at a point exchange rate of '0.97', a desire to exchange 1000P for yen at a point exchange rate of '0.95', a desire to exchange 500P for yen at a point exchange rate of '0.93', a desire to exchange 500P for yen at a point exchange rate of '0.91', and a desire to exchange 500P for yen at a point exchange rate of '0.90'.

Number of available points for purchase for a user who wants to buy the Company A points is also displayed in FIG. 7, and points may be bought using a method described later through confirmation of this list.

The second screen from the right in FIG. 7 is a registration/change input screen for desired conditions, and exchange conditions for the Company A points are set with reference to this screen. When number of exchanging points is input on this screen, the transaction rate is set using the down arrow button and the up arrow button, and 'Register under this condition' is clicked, for example, to register it as a condition, a display to the effect that registration of the desired condition has been completed is sent back, as shown in the right side upper row of FIG. 7, for example.

When the transaction is completed under the desired condition of this side of the transaction, a confirmation email to the effect that the transaction has been established as shown on the screen on the right end lower side of FIG. 7 is sent. The transaction condition is displayed in a confirmable manner in the lower part of the former condition registration screen, and when the condition shown on this display is satisfactory, the transaction is then established under this condition.

In the case of a point-electronic money transaction as shown in the right side third row of FIG. 5, the electronic money for transaction is selected. Once electronic money is specified, sales transaction status for said electronic money type is confirmed.

Figure 8:
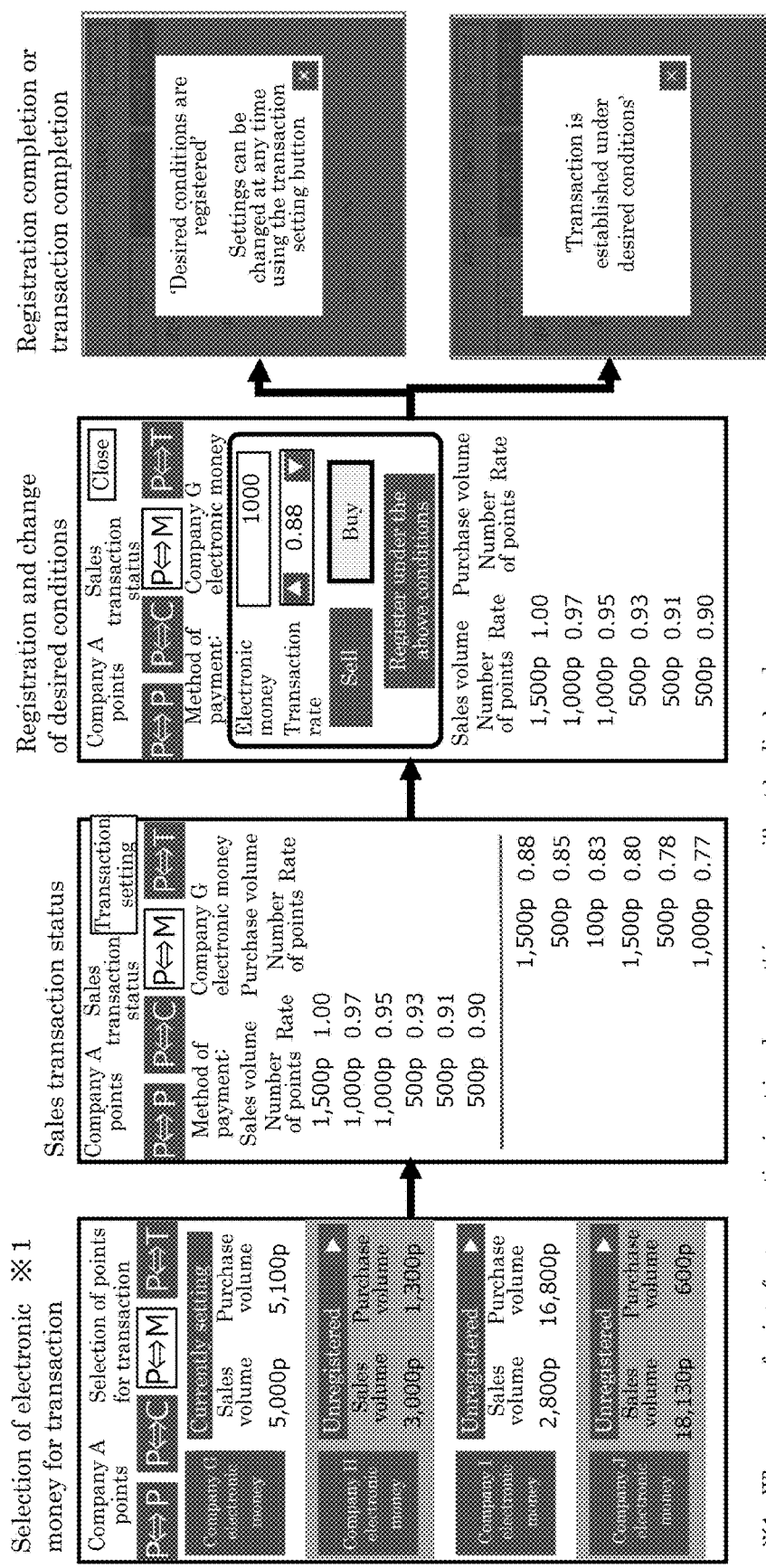
FIG. 8 is a diagram for describing a point-electronic money exchange process of the embodiment.

When processing continues to proceed, registration or change of the desired conditions of this side of the transaction is carried out. If the exchange conditions match, a confirmation email to the effect that the transaction has been established as shown on the screen on the right end lower side of FIG. 8 is then sent.

Details of this point-electronic money exchange process is described with reference to FIG. 8. FIG. 8 is a flowchart for describing the details of the point-electronic money exchange process.

In FIG. 5, when trying to exchange the Company A points for electronic money, electronic money type is selected on the electronic money list screen in the left end part of FIG.

8. Then, processing proceeds to the flow illustrated towards the right in FIG. 8, and the sales transaction status screen which is second from the left in FIG. 8, is displayed.

Here, as an example of a transaction of buying Company A points using electronic money of Company G, point exchange conditions (transaction conditions) for a person wanting to exchange electronic money of Company G for the Company A points are displayed.

Six conditions are specified as point exchange conditions in the example of FIG. 8. The conditions are: a desire to exchange 1500P for electronic money at a point exchange rate of '1', a desire to exchange 1000P for electronic money at a point exchange rate of '0.97', a desire to exchange 1000P for electronic money at a point exchange rate of '0.95', a desire to exchange 500P for electronic money at a point exchange rate of '0.93', a desire to exchange 500P for electronic money at a point exchange rate of '0.91', and a desire to exchange 500P for electronic money at a point exchange rate of '0.90'.

The number of available points for purchase is also displayed in FIG. 8 for a user who wants to buy the Company A points, and the user is able to buy through confirmation of this list.

The second screen from the right in FIG. 8 is a registration/change input screen for desired conditions, and exchange conditions for the Company A points are set with reference to this screen. When the number of exchange points is input on this screen, the transaction rate is set using the down arrow button and the up arrow button, and 'Register under this condition' is clicked, for example, to register it as a condition, a display to the effect that registration of the desired condition has been completed, as shown in the right side upper row of FIG. 8, for example, is sent back.

When the transaction is completed under this desired condition, a confirmation email to the effect that the transaction has been established as shown on the screen on the right end lower side of FIG. 8 is sent. The transaction condition is displayed in a confirmable manner in the lower part of the former condition registration screen, and when the condition shown on this display is satisfactory, the transaction is then established under this condition.

In the case of a point-digital ticket transaction as shown in the fourth row (lowest row) on the right side of FIG. 5, a digital ticket for transaction is selected. When the desired digital ticket is displayed and exchange is possible, once the digital ticket desired to be exchanged is specified, the sales transaction status for said digital ticket type is confirmed.

When processing continues to proceed, registration or change of the desired condition of this side of the transaction is carried out. If the exchange conditions match, a confirmation email to the effect that the transaction has been established is then sent in the same manner as described above.

The details of this point-digital ticket exchange process are the same as in the cases of FIG. 6 to FIG. 8. When trying to exchange the Company A points for a digital ticket in FIG. 5, tickets desired to be exchanged for points are listed. Therefore, once the type of ticket desired to be exchanged is selected, a sales transaction status screen is displayed in the same manner as described above.

For example, point exchange conditions (transaction conditions) for a user wanting to exchange and asking how many of Company A points can be exchanged are displayed.

In the case where a plurality of the same kind of ticket can be exchanged as an exchange condition, respective exchange conditions are specified. The user then confirms exchange conditions, and registers his/her own desired exchange conditions. As a result of registration of these desired conditions or registration of changed conditions, a display to the effect that registration of the desired conditions has been completed is sent back, as in the same manner as in the other exchange processes.

When the transaction has completed under these conditions, a confirmation email to the effect that the transaction has been established is sent. The transaction conditions are displayed in a confirmable manner in the lower part of the conditions registration screen. When the conditions in this display are satisfactory, the point-digital ticket transaction is established under these conditions.

In the above description of the embodiment, the service top screen shown at the left end of FIG. 3 has been displayed as a default screen on the customer's terminal that has accessed the point transaction management unit 100. Moreover, a process of proceeding to the screen displaying the respective exchange target lists in the top part of the screen has been carried out.

Furthermore, in the point-cash exchange process, transaction on the basis of not only Japanese yen, but also on the basis of US dollars, European euros, Chinese yuan, etc. is possible. Since the value (foreign exchange rate) between the respective currencies changes every minute, the embodiment allows easy confirmation of a typical foreign exchange rate at a desired time for point exchange in the point transaction process using foreign currency, and controls such that the foreign exchange rate can be easily visually confirmed so as to allow exchange of points exactly according to the foreign exchange rate.

Next, this foreign exchange rate confirmation process is described with reference to the flow chart of the international transaction of FIG. 9. The following description is of an example where a user confirms a foreign exchange rate and decides the point exchange rate on his/her own. However, the following description is not limited to this example. In the control described below, in the case where the foreign exchange rate for Japanese yen is found, it may be controlled so as to reflect the acquired foreign exchange rate on the point exchange rate for Japanese yen, and to set the point exchange rate for Japanese yen for points to be exchanged. Therefore, the point exchange rate corrected according to the foreign exchange rate for transaction currency is automatically calculated and is used.

Details of an international transaction according to the embodiment is described below with reference to FIG. 9. The embodiment provides an 'International transaction' button on the right side of the top row on the service top screen. When said button is clicked, the processing described above is carried out, and in addition not only a customer living in Japan using Japanese yen but also a person living in a foreign country is allowed to acquire points of a partnering point company with foreign currency. In this case, the updated currency exchange rate for an available currency can be confirmed by the currency exchange rate management unit 190, and payment processing using the user's currency is controlled by the currency control unit 120.

The international transaction process in which the 'International transaction' button on the right side of the top row on the service top screen is clicked is described with reference to FIG. 9 as well.

Figure 9:
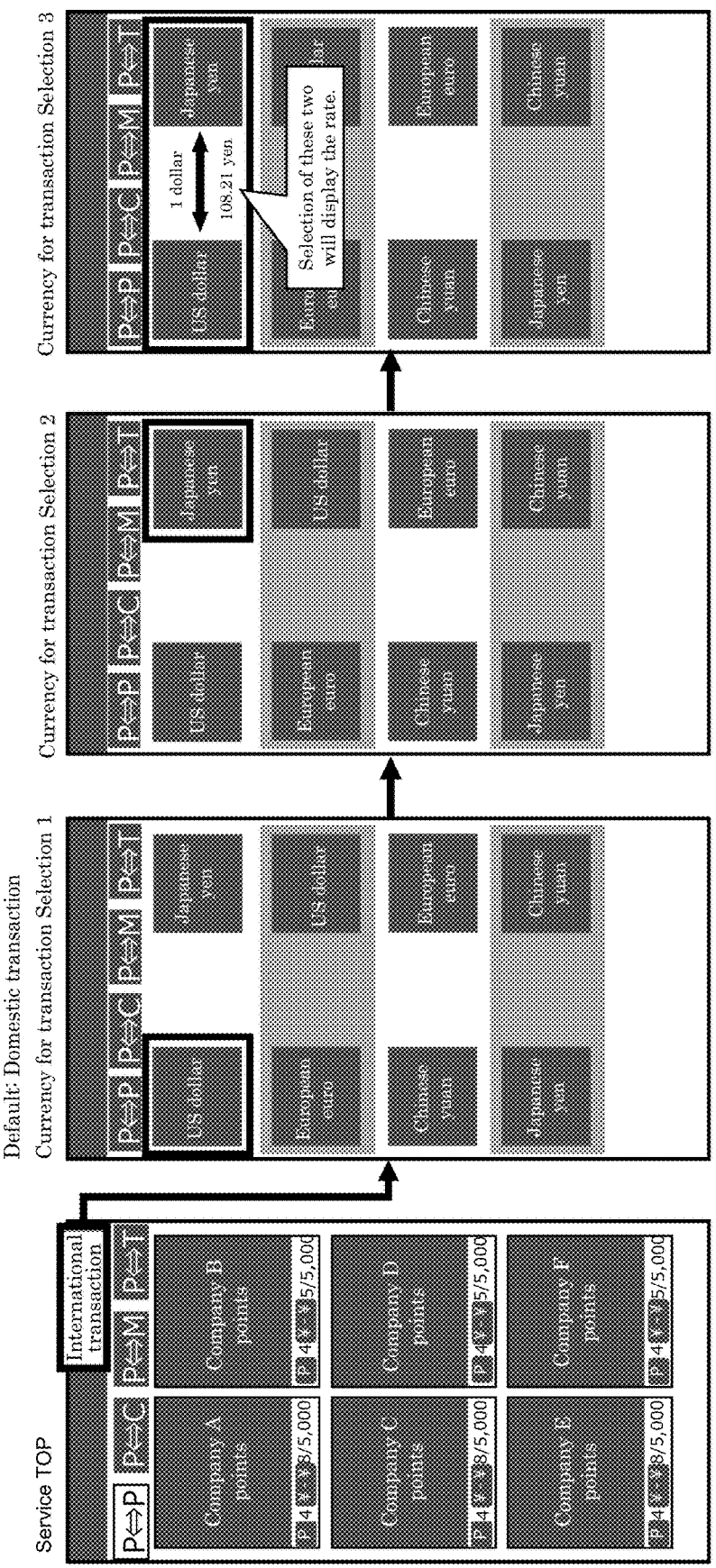
FIG. 9 is a diagram for describing an international transaction process of the embodiment.

FIG. 9 is a diagram for describing the international transaction process of the embodiment. An 'International transaction' button is prepared on the right side of the top row on the service top screen, and when said button is clicked, the transaction currency selection screen which is second from the left in FIG. 9 is displayed.

Here, for example, one of the currency buttons displayed on the left end side of the transaction currency selection screen is selected. More specifically, 'US dollars' is selected so as to select a corresponding currency for confirming the foreign exchange rate. On the transaction currency selection screen, a black border is displayed so that which currency is the selected currency can be easily recognized. This status is shown as a 'Selection 1 for currency for transaction' screen which is second from the left in FIG. 9.

'Japanese yen' for checking the rate is then selected as displayed in a 'Selection 2 for currency for transaction' screen shown on the right side of the 'Selection 1 for currency for transaction' screen. By selecting two currencies in this way, processing proceeds to a 'Selection 3 for currency for transaction' screen on the right end side of FIG. 9, and the foreign exchange rate for the two selected currencies is displayed. Confirmation of this display allows easy confirmation of point values for the specified currencies when exchanging points.

When points are attempted to be acquired using foreign currency as described above, the value of the points is linked to the value of yen in most cases. Therefore, with the foreign exchange rate of the currency selected in the process of FIG. 9 to yen being acquired and displayed, it may be possible to control so as to set the yen-based point exchange rate as illustrated in FIG. 7, and to display a setting button for changing to another currency in order to make currency selectable, wherein once another currency is selected, it is automatically converted to the point exchange rate according to the foreign exchange rate and is set.

On the other hand, when the point exchange rate for a foreign currency is set, it may be controlled so as to automatically convert to the currency exchange rate for Japanese yen and display it. Such control may provide a point exchange system making it easy to exchange points using foreign currency.

According to the embodiment as described above, points issued for each kind of point system can be used effectively.

Moreover, in this way, even if user does not acquire his/her own payment account beforehand, nor does he/she has his/her own acquired points, he/she can use electronic money which allows easy use of point exchange. Furthermore, points can be acquired with cash, making it possible to exchange points according to the foreign exchange rate.

Further, since game points essential for executing online games are also available as transaction objects, it is possible for user to make further effective use of his/her own acquired points. Even further, since digital tickets in addition to such points have been added to those available for exchange, almost all valuables that can be exchanged online become available for exchange, and effective use of digital valuables is possible.

Digital tickets (valuables) that can be exchanged for various points or valuables may include the following exchange objects. 'Digital tickets', 'digital gift vouchers', 'airplane tickets', 'utilization tickets for games or content', 'vehicle tickets', 'ship tickets', and anything else that can be purchased over the Network can be exchanged in an auction style, thereby providing a system that satisfies both parties desiring an exchange.

This allows effective use of possessed points, and exchange of possessed points without wasting unused tickets, etc.

More specifically, the digital valuables provided by registered members exemplified above that can be handled in the embodiment are classified by type and registered in the digital valuable database 500. In that case, the registered member specifies a desired exchange point rate for the valuable and registers it.

At the time of exchanging for points, a valuable type selection screen is displayed so as to make it possible to select a digital valuable type when the transaction target selection screen is displayed. When a valuable type desired for exchange is selected here, processing proceeds to a screen for selecting exchangeable valuables, and a specific valuable and desired exchange point rate are displayed. Control at the time of point exchange after selection is the same as with the general points described above, and there is no difference.

While the types of valuables include 'digital tickets', 'digital gift vouchers', 'airplane tickets', 'utilization tickets for games or content', 'vehicle tickets', 'ship tickets', etc., they are not limited to the above examples, and others may be added appropriately. If online transmission is possible at hand of the person making the exchange, any valuable can be added as an exchange object. Moreover, valuables that can be sent by post or home delivery may also be added.

Other Embodiment

With the point exchange system according to the above embodiment, acquisition of points is allowed for registered customers (users). It is important with the point exchange system of the embodiment that many applicants participate in exchanging points, and that exchange is carried out quickly and surely.

However, for example, even if point exchange is desired and exchange conditions are set beneficial for another exchanging party, it does not mean that another exchanging party will appear immediately. In some cases, an exchange may never occur. When there are lots of such cases, convenience and reliability may greatly decrease.

For example, in the following case, difficulty in transfer of points is anticipated.

(1) In the case of points belonging to a newly entered point group or at the beginning of starting up the system of the embodiment, there is a chance that personal trading will not materialize.

(2) Even after being acknowledged, there is a possibility that no transferring party may be decided, because of strict point-exchange conditions and the like.

(3) Setting conditions for a personal transaction of points with a close expiration date may be difficult.

In preparation for such a case, other embodiment according to the present invention allows presentation of predetermined exchange conditions to a system manager, a specific partner and/or a person wanting to exchange points as described above, and allows exchange of points, thereby making more effective transfer of points possible.

A point exchange processing according to other embodiment of the present invention structured in this manner is described with reference to FIG. 10 and FIG. 11.

In the other embodiment, a basic system configuration also includes the system configuration given in FIG. 1 described above, and a basic point exchange process is executed by the same processing flow illustrated in FIG. 2 to FIG. 9. The basic processing flow is illustrated in FIG. 10.

Figure 10:
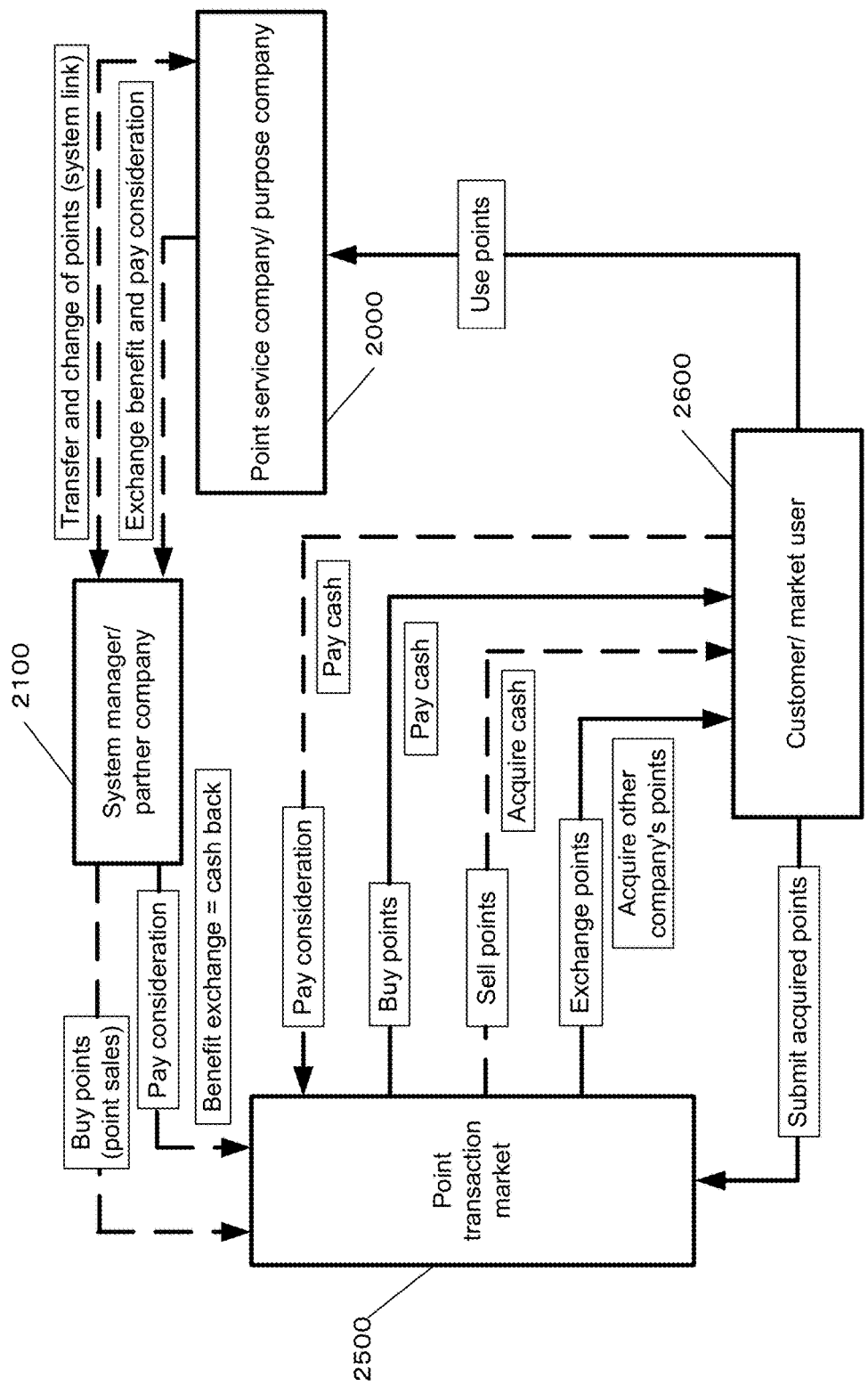
FIG. 10 is a diagram for describing a point exchange process of another embodiment according to the present invention.
Figure 11:
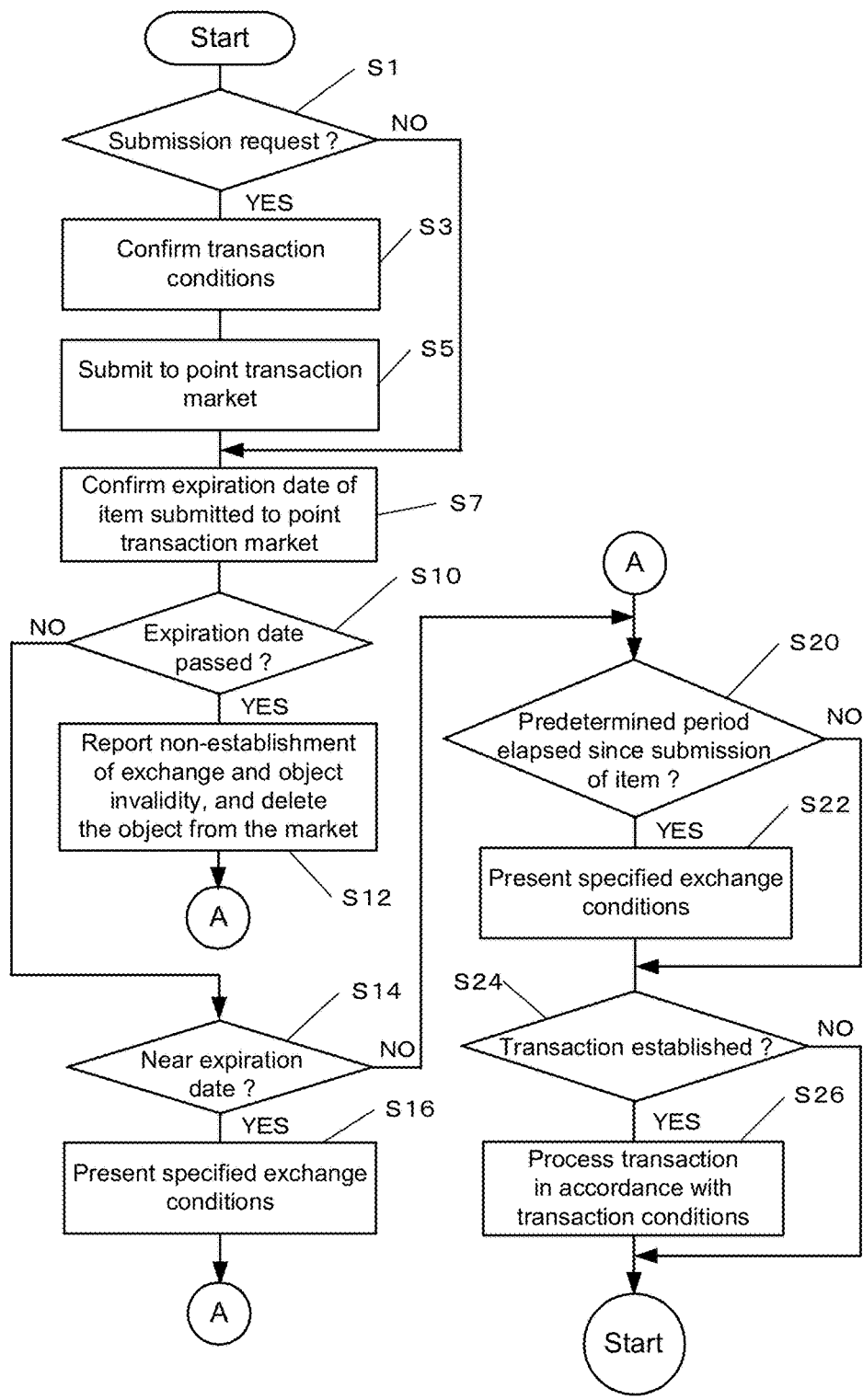
FIG. 11 is a flowchart illustrating the point exchange process of the other embodiment.

As shown in FIG. 10, processing in the case where points issued by a point service company (purpose company) 2000 that have been acquired by a customer (market user) are submitted to a point transaction market 2500 managed by a system manager (or partner company) 2100 is described.

A typical point process corresponds to a case where points acquired by a customer 2600 shown in the lower part of FIG. 10 are used at a store managed by a point service company. Basically, there is no difference from the process described above.

On the other hand, utilization of the point transaction market 2500 according to other embodiment of the present invention allows the customer 2600 to specify point exchangeable conditions for his/her own acquired (possessed) points and to submit them to the point transaction market 2500.

As exemplified in FIG. 10, as a means of acquiring points of another company that have been submitted to the point transaction market 2500, (1) a transaction of buying points and paying consideration (currency) in order to acquire desired points, (2) a transaction of selling possessed points so as to acquire currency, and (3) a point exchange transaction of exchanging for points of another company are possible.

With the above point transaction, usable currency is not limited to Japanese yen, and different currencies may be used. It is not limited by currencies that can be used.

Regarding the above transactions, the system manager 2100 reports to the point service company 2000 that points have been transferred to another possessor when a point exchange transaction had been established in the point transaction market 2500. This report is linked to processing in the system and is carried out automatically.

Moreover, there are cases where benefit exchange (cash back) for the acquired points is set by the point service company 2000, and in that case, it is paid from the point service company to the system manager side, for example.

Furthermore, in the case where a point transfer in the point transaction market 2500 is anticipated difficult by the system manager 2100, the point transaction market may become unattractive if such a difficulty is neglected. Therefore, in this case, possibility is high that transaction of points or digital tickets that have an expiration date of less than one month, for example, between individuals is not established. As a result, a method of where the system manager negotiates with the point service company or a digital ticket issuing company so as to obtain a favorable condition for having the point issuer buy back at a value equal to or less than the value at the time of issue, thereby implementing the buy-back transaction under the condition, is employed.

Such a specified exchange condition for the point transaction may vary according to the result of negotiation with the point service company or the digital ticket issuing company. When presenting this specified exchange condition, it is necessary to express clearly that this is a final condition for point exchange, thereby preventing forfeiture of points due to expiration of the points. Implementation of this point exchange is a characterizing feature of the other embodiment.

On the other hand, the embodiment may measure the elapsed time since point exchange is desired, and if the point exchange has not been established after a fixed period, there is a high probability that such a point exchange will not be established if things continue as such, and therefore automatic reexamination of the exchange conditions may be proposed.

A specific example of the point exchange process of the other embodiment is described with reference to the flowchart of FIG. 11. Even with the other embodiment, the basic point exchange process is the same as that in the above-described embodiment. First, in step S1, it is determined whether or not there is an acquired point submission request to the point transaction market 2500 from the customer 2600. If there is no point submission request, processing proceeds to step S7.

On the other hand, if there is a point submission request, processing proceeds from step S1 to step S3, wherein point transaction conditions of the submitter are set and confirmed. Once the transaction conditions of the points are confirmed, processing proceeds to step S5 to submit the points to the point transaction market 2500. Processing then proceeds to step S7.

In step S7, the system manager/partner company 2100 confirms the expiration date of an exchange object such as points or digital tickets that are submitted to the point transaction market 2500. Whether the exchange object has passed the expiration date is confirmed next in step S10. If the expiration date has not passed, processing proceeds to step S14.

On the other hand, if there is an exchange object that has passed the expiration date, processing proceeds to step S12, wherein non-establishment of exchange and object invalidity are reported to the submitter and the object is deleted from the market. Processing then proceeds to step S20.

If processing has proceeded from step S10 to step S14, it is determined whether the remainder of the validity period of the exchange object such as points or digital tickets submitted to the market in step S14 is within a predetermined period of time, for example, one month. When the remainder of the term of validity is equal to the predetermined period of time or longer, processing proceeds to step S20.

Meanwhile, if the remainder of the validity period of the exchange object falls within the predetermined period of time, processing proceeds to step S16. In this case, point exchange for an individual user is considered to be difficult, then the system manager or a partner company partnering with the system manager presents a specific exchange condition instead of the customer, and processing proceeds to step S20, in which he/she is prompted to exchange.

Note that in the case where the period from the initial submission is short, step S16 may be skipped until the fixed period has passed. This specified exchange condition may be a form of transaction of the system where the system manager, for example, negotiates ahead of time with the point issuer or the digital ticket issuer so as for him/her to take back an object that is close to the expiration date. In such a case, presenting the take-back condition as a specific exchange condition is assumed.

When presenting this specific exchange condition, reports to the effect that the expiration date is approaching, and to the effect that it should be considered as a final exchange condition may be sent. This allows reduction in cases where an exchange object becomes invalid and worthless.

Meanwhile, in step S20, elapsed time since submission of the exchange object is checked to see whether the predetermined period has elapsed. If the predetermined period has not elapsed, processing proceeds to step S24.

If the predetermined period has elapsed, the probability that a transaction may be established is considered low, whereby processing proceeds to step S22 in which a specified exchange condition is presented, and processing then proceeds to step S24. This specified exchange condition may be the same as the condition of step S16, or it may be a different exchange condition. A corresponding example here may be the case where the submitted object (points) is not widely known because it is newly admitted points to the point transaction market.

Meanwhile, in step S24, the transaction condition for the object submitted to the point transaction market 2500 is authorized, and whether a transaction has been established is checked. If a transaction is not established, processing returns to step S1.

If a transaction has been established, processing proceeds to step S26, where the transaction in accordance with the transaction condition is carried out. In the case of point exchange, processing, such as reporting to the point service company of a change in point possessor, is carried out.

According to the other embodiment as described above, in the case where the probability that a transaction of points, digital tickets, etc. may be established is considered low when points are submitted to the transaction market 2500, a specified exchange condition is presented so as to attempt establishing a transaction, thereby allowing prevention of the object from becoming invalid due to the transaction not being established. In this case, having the issuer take back the object allows increase in value in use of points, etc., and allows effective prevention of value expiration.

INDUSTRIAL APPLICABILITY

Points acquired from multiple point plans are applicable to exchange amongst themselves, to exchange for points acquired from foreign countries as well as domestic Japanese point plans, and to exchange for points of another user that has used the network system or the like. This allows effective use of points etc. acquired by the customer, and prevention of waste of points etc.

The invention claimed is:

1. A point management system comprising:
a point management processor configured to:
allow an exchange of points among different customers via a communication network by using a communication terminal connected thereto, and
add up points acquired by a customer and allow a transfer of points belonging to a point group, which allows customers to enjoy a benefit using the added-up points, wherein said point management processor further comprises:
a currency exchange rate detector for detecting, via the communication network, a foreign exchange rate for a foreign currency;
a specifying unit for enabling the customers operating the communication terminal to specify an exchange condition for carrying out the transfer of points belonging to the point group by exchanging the added-up points for other valuables;
an exchange condition display for displaying on the communication terminal the exchange condition for points to be exchanged specified by the specifying unit, so as for the customer to determine whether or not an exchange is to be carried out and to specify an exchange condition of the customer while taking into consideration an exchange condition of another customer;
a valuables selector for enabling the customers operating the communication terminal to select a type of valuables desired to be exchanged by the customer by confirming the exchange condition displayed by the exchange condition display;
a foreign exchange rate reflection/display unit for automatically calculating a number of points to be exchanged so that when selecting points issued in a foreign country as the valuables, the foreign exchange rate of the foreign currency detected by the currency exchange rate detector is reflected on the number of points to be exchanged, and displaying on the communication terminal a point exchange condition on which a change in monetary value is reflected;
a point exchange establishment status determining unit for determining an establishment status for a transfer of points belonging to a point exchange applicant; and
a point exchange condition output unit for presenting to the point exchange applicant a predetermined point exchange condition in accordance with determination results of the point exchange establishment status determining unit, wherein
a point exchange for the points issued in the foreign country reflect the foreign exchange rate thereon, and a point exchange under the point exchange condition presented by the point exchange condition output unit is allowed.

2. The point management system according to claim 1, wherein the valuables include electronic money, game points usable for games, and digital tickets including concert tickets, admission tickets, utilization tickets, and exchange tickets.

* * * * *